(12) United States Patent
Schwering

(10) Patent No.: US 6,717,943 B1
(45) Date of Patent: Apr. 6, 2004

(54) SYSTEM AND METHOD FOR ROUTING AND PROCESSING DATA PACKETS

(76) Inventor: David Schwering, 223 University Blvd., Silver Springs, MD (US) 20901-4744

( * ) Notice: Subject to any disclaimer, the term of this patent is extended or adjusted under 35 U.S.C. 154(b) by 0 days.

(21) Appl. No.: 09/325,206

(22) Filed: Jun. 3, 1999

(51) Int. Cl.[7] ............................................. H04L 12/56
(52) U.S. Cl. ...................................... 370/389; 370/401
(58) Field of Search ...................... 717/149; 712/203; 709/224; 370/401, 389

(56) References Cited

U.S. PATENT DOCUMENTS 5,138,447 A * 8/1992 Shen et al. ................. 358/133
6,078,957 A * 6/2000 Adelman et al. ........... 709/224

* cited by examiner

*Primary Examiner*—Kenneth Vanderpuye
(74) *Attorney, Agent, or Firm*—John F. Letchford; Klehr, Harrison, Harvey, Branzburg & Ellers LLP

(57) ABSTRACT

The present invention is a system for processing data packets between an internal environment to the system and external environment to the system comprising a plurality of processors within the internal system, each processor processing data packets based upon a criteria of the packet, first cable means for connecting the plurality of processors and for transmitting data packets between said plurality of processors, second cable means for transmitting the data packets between the plurality of processors and to the external environment, and third cable means for transmitting data between the plurality of processors and the internal environment.

14 Claims, 7 Drawing Sheets

| SOURCE IP | | |
|---|---|---|
| DESTINATION IP | | |
| PORT NUMBER | | |
| CONTENT | | |
| | | |

FIG. 3

SYSTEM AND METHOD FOR ROUTING AND PROCESSING DATA PACKETS

FIELD OF THE INVENTION

The present invention is directed to the routing of data packets. In particular, the present invention is directed to systems which prevent the unauthorized access to packetized information, which reduce processing costs and time, and which prevent the loss of transmitted information.

BACKGROUND OF THE INVENTION

Connectivity and security are two competing objectives of the computing environment in most organizations. The typical modern computing system is built around network communications and supplying transparent access to a multitude of services. The global availability of these services is perhaps the single most important feature of modem computing solutions. Demand for connectivity comes from both outside and inside organizations.

Protecting network services from unauthorized usage is of importance to any organization. Any PC work station, once connected to the Internet can offer all of the features which are offered to any other stations on the network. Using available technology, an organization must give up much of its connectivity in order to prevent the threat of loss or theft, even to the point of eliminating some or all connections to the outside environment or to other sites.

As the need for increased security grows, the means for controlling access to network resources has become an administrative priority for many companies. In order to save costs and maintain productivity, access control must be simple to configure and "transparent" to both users and applications. The minimization of set up costs and down time are also important factors.

Computerized data is typically transmitted in packets. A "packet" is a sequence of bytes delivered by the communication line that are rendered distinct from other sequences of bytes, according to a "protocol" applied when the bytes are "encoded" and decoded. Packet techniques are well know to those skilled in the art and include, for example, the Ether-Net Protocol (IEEE Standard 802.3) and various commercial packet protocols such as the Synchronous Datalink Protocol (SDLC) and Expoint 2.5. A "circuit" monitors incoming communication line and determines when the packet begins. Bytes of the packet are then processed until packet reception is complete.

Commercially available circuits and interfaces are known for performing the tasks of recognizing the beginning of a packet and the processing of bytes until complete, for example, as known from a byte count and marker or the like. The generic function of receiving packets is thus well known in the art. However, once a packet or sequence of bytes is extracted from the communication network, there are a variety of possibilities as to how the encoded data are to be processed.

In a conventional broadcast network, the sender of the data packet encodes information that explicitly determines a recipient, or a set of recipients, to whom the data packet is directed. The recipient, or set of recipients, is identified in the packet by the sender inserting specific bytes in the message at the time of transmission. Conventional circuitry as described above, for example, recognizes information at a predetermined byte or bit position, typically in a header block at the start of the packet. This information is used to identify the intended receiver or receivers. Only packets destined for the respective data processing equipment require intervention by that data processing equipment and other packets can be ignored.

"Packet filtering" is a method which allows connectivity, yet provides security by controlling the traffic being passed, thus preventing illegal communication attempts, both within single networks and between connected networks. The current implementation of packet filtering allows specification of access and list tables according to a fixed format. This method is limited in its flexibility by the organizations' security policy. It is also limited to the set of protocols and services defined in that particular table. This method also does not allow the introduction of different protocols or services which are not specified in the original table. Another method of implementing packet filtering is tailoring the computer-operating system code manually in every strategic point in the organization. This method is limited by its flexibility to future changes in network topology, new protocols, enhanced services, and to future security threats. It requires a substantial amount of work by experts modifying proprietary computer programs, making it inefficient and expensive to set up and maintain.

In addition to protecting data transmission, the need for secure long distance communications between enterprises, branch offices and business partners is becoming an essential requirement in modern day business practice. Historically, dedicated point-to-point connections between networks were fully private inter-enterprise commerce and long distance transactions. However, their inflexibility and prohibitive costs have prevented their widespread use. Public networks such as the Internet, provide a flexible and inexpensive solution for long distance inter-networking. Instead of establishing dedicated lines, enterprises can communicate using the Internet as a mediator. Once connected to a local Internet provider, private networks can quickly connect to any destination around the world. These issues force additional security issues.

A number of prior art patents are directed to data routing systems and for methods of providing data security. U.S. Pat. No. 5,805,572 discloses a transparent routing system within the "cluster" which is achieved (without changing the networking code on each "node" of the cluster) by using a pair of "modules" interposed on the networking "stack". In a "clustered" system built out of several computers, the networking subsystem appears to "applications" as if the applications are running on a single computer. In addition, no modifications to the networking code is needed. The disclosed system is extensible to a variety of networking protocols, allows the routing within the cluster to be performed dynamically. A packet filter and remote communication between the nodules through IDL enable the modules to function.

In U.S. Pat. No. 5,608,662, a "data processor" is connected to a digital communication system such that information packets broadcast on the system are examined to determine if the contents of each packet meet selection criteria, whereupon the packet is "coupled" to the "processor". A "state machine" or "interface processor" is connected between the processor and the network, and compares packets to the selection criteria, passing accepted packets and blocking rejected ones. The selection criteria are programmed into the state machine as a "decision tree" of any length, configuration or data requirements, preferably by the attached data processor, and can include examination of arbitrary sections of the packet for equality/inequality greater-than/less than, signed and unsigned comparisons and bit mask comparisons. Thus, content is variably examined, as opposed to checking for an address or key code at a given byte position. The state machine operates on recognition instructions including "byte offset" and content specifics. The recognition instructions can include "plural distinct" criteria, determined by the data processor to serve applications programs running in a "multi-tasking" environment. Thus, the data processor compiles a series of recognition instructions that are passed to the state machine as tasks in the multi-taking environment are added or deleted, or when a task decides to change selection requirements. Preferably, "signaling lines" allow the data processor to determine the reason for selection of a packet, for example, by the state machine reporting to the data processor its program count upon acceptance.

U.S. Pat. No. 5,715,418 discloses a system which translates between "physical and logical (or virtual) address spaces" autonomously using information decoded by an address mode translator from command bits within a host CPU issued command. The disclosed translator communicates with a hard disc controller unit local microprocessor or microcontroller and controller unit task registers. A host CPU issued command interrupts the local microprocessor and activates the address mode translator by writing to an appropriate controller unit task register using indirect addressing. The address mode translator preferably provides four algorithms, with algorithm selection occurring autonomously according to the decoded command bits. The algorithms provide physical block address to physical "CHS" cylinder-head-sector conversion, logical CHS to logical block address conversion, and also provide divide and multiply functions, useful for disc catching. Upon completion of the conversion or other function procedure, the address translator signals that the processed result is ready for reading by the controller unit local microprocessor or microcontroller. The translator may be implemented as a microprogrammed sequencer with an instruction set tailored to perform linear address translations and stored in memory associated with the local microprocessor. Alternatively, the instruction set may be downloaded by the microprocessor from disc drive software. The address translator provides the microprocessor with a translated address in a usable form more rapidly than if the local microprocessor had made the translation.

U.S. Pat. No. 5,742,792 discloses a system in which two data storage systems are interconnected by a data link for remote mirroring of data. Each volume of data is configured as local, primary in a remotely mirrored volume pair, or secondary in a remotely mirrored volume pair. Normally, a host computer directly accesses either a local or a primary volume, and data written to a primary volume is automatically sent over the link to a corresponding secondary volume. Each remotely mirrored volume pair can operate in a selected synchronization mode including synchronous, semi-synchronous, adaptive copy—remote write pending, and adaptive copy—disk. Direct write access to a secondary volume is denied if a "sync required" attribute is set for the volume and the volume is not synchronized. If a "volume domino" mode is enabled for a remotely mirrored volume pair, access to a volume of the pair is denied when the other volume is inaccessible. In a "links domino" mode, access to all remotely mirrored volumes is denied when remote mirroring is disrupts by an all-links failure. The domino mode can be used to initiate application-based recovery, for example, recovering a secondary data file using a secondary log file. In an active migration mode, host processing of a primary volume is concurrent with migration to a secondary volume. In an overwrite cache mode, remote write-pending data in cache can be overwritten. Write data for an entire host channel command word chain is bundled in one link transmission.

U.S. Pat. No. 5,606,668 discloses a system in which a filter module allows controlling network security by specifying security rules for traffic in the network and accepting or dropping communication packets according to these security rules. A set of security rules are defined in a high level form and are translated into a packet filter code. The packet filter code is loaded into packet filter modules located in strategic points in the network. Each packet transmitted or received at these locations is inspected by performing the instructions in the packet filter code. The result of the packet filter code operation decides whether to accept (pass) or reject (drop) the packet, disallowing the communication attempt.

U.S. Pat. No. 5,832,222 discloses a computer system having a sealable software architecture. The sealable communication or data replication architecture that enables transparent replication of data or state information over a network of geographically dispersed processing units. Transparent data replication over a geographically dispersed computer network is useful in applications such as parallel computing and disaster recovery. The communication architecture also provides a transparent interface to a kernel I/O subsystem, device drivers and system applications. The communication architecture provides a distributed data model presenting a single system image of the I/O subsystem that allows two or more geographically dispersed processing units or clusters thereof, access to common data. In one particular implementation, the communication architecture permits RAID algorithms, such as RAID level 1 and RAID level 1 and RAID level 5 state information to be applied to the geographically dispersed network for site disaster recovery. The distributed data moxiel software package may be a uni-processor or multi-processor system, each having the same or different operating environments.

Finally, U.S. Pat. No. 5,835,726 discloses a novel system for controlling the inbound and outbound data packet flow in a computer network. By controlling the packet flow in a computer network, private networks can be secured from outside attacks in addition to controlling the flow of packets from within the private network to the outside world. A user generates a rule base which is then converted into a set of filter language instruction. Each rule in the rule base included a source, destination, service, whether to accept or reject the packet and whether to log the event. The set of filter language instructions are installed and execute on inspection engines which are placed on computers acting as firewalls. The firewalls are positioned in the computer network such that all traffic to and from the network to be protected is forced to pass through the firewall. Thus, packets are filtered as they flow into and out of the network in accordance with the rules comprising the rule base. The inspection engine acts as a virtual packet filtering machine which determines on a packet by packet basis whether to reject or accept a packet. If a packet is rejected, it is dropped. If it is accepted, the packet may then be modified. Modification may include encryption, decryption, signature generation, signature verification or address translation. All modifications are performed in accordance with the contents of the rule base.

While there are a number of prior art systems for routing data packets and security, none provide a fast, reliable, and efficient method for processing data packets transmitted between computers via intranet or the Internet. The present invention is directed to a system and method for processing data packets, in order to protect them from theft and destruction. The present invention is directed to a fast, reliable and efficient method to process data packets. The present invention is specifically directed to a system and method for processing data packets based upon specific criteria such as the number position of the packet. The true nature and scope of the present invention is to be determined by reference to the detailed description and attached claims.

SUMMARY OF THE INVENTION

The present invention comprises a system for processing data packets between an environment internal to the system and an environment external to the system. The system comprises a plurality of processors within an internal environment, each processor processing data packets based upon an initial criteria of the packet, first cable means for connecting the plurality of processors and for transmitting data packets between said plurality of processors based upon said initial criteria, second cable means for transmitting data packets between the plurality of processors and to the external environment, and third cable means for transmitting data between the plurality of processors and the internal environment. In each case, the cable could be either physical (including PCB cases) or logical.

In a further embodiment, the present invention is directed to a method for transmitting secured data packets over a network comprising the following steps (a) receiving a data packet having a source address from a point external to the network, (b) determining whether the data packet is a zero packet, and if so: (i) determining the binary sequence of a bit set (e.g., as shown in FIGS. 3 and 4) of the source address of the packet, (ii) forwarding the packet to a processor whose number corresponds with the sequence of the aforementioned bit set, (iii) using a security table to generate an IT entry in an IT table for directing the processing of data packets, (iv) transmitting the IT entry to a plurality of processors for inclusion in said IT table, (v) processing the packet in accordance with the entry in the IT table that corresponds to the source address, destination address and point number of the packet; (c) determining whether the packet is the last packet of the message, and if so: (i) deleting the IT entry for the message from the IT table, and (ii) forwarding the packet for further processing.

In still a further embodiment, the present invention is directed to a system for processing data packets between an environment external to the system and an environment internal to the system, comprising a plurality of processors within an internal system, each processor processing data packets based upon the sequence number of the packet, first cable means for connecting the plurality of processors and for transmitting data packets between said plurality of processors based upon the said sequence number, second cable means for transmitting data packets between the plurality of processors and the internal environment, and third cable means for transmitting data between the plurality of processors and a point internal to the system.

In yet another embodiment, a method for transmitting secured data packets over a network comprising the following steps: (a) receiving a data packet from a point external to the network, (b) determining whether the data packet is a zero packet, and if so: (i) determining the binary sequence of a bit set of the source address of the packet, (ii) forwarding the packet to a processor whose number corresponds with that bit set, (iii) using a security table to generate an IT entry in an IT table for directing the processing of data packets, (iv) transmitting the IT entry to a plurality of processors for inclusion in said IT table, (v) processing the packet in accordance with the entry in the IT table that corresponds to the source address, destination address and point number of the packet; (c) determining whether the packet is the last packet of the message, and if so: (i) deleting the IT entry for the message from the IT table, and (ii) forwarding the packet for further processing.

BRIEF DESCRIPTION OF THE FIGURES

FIG. 3 is a diagram of an IT table.

DETAILED DESCRIPTION OF THE INVENTION

Figure 1:
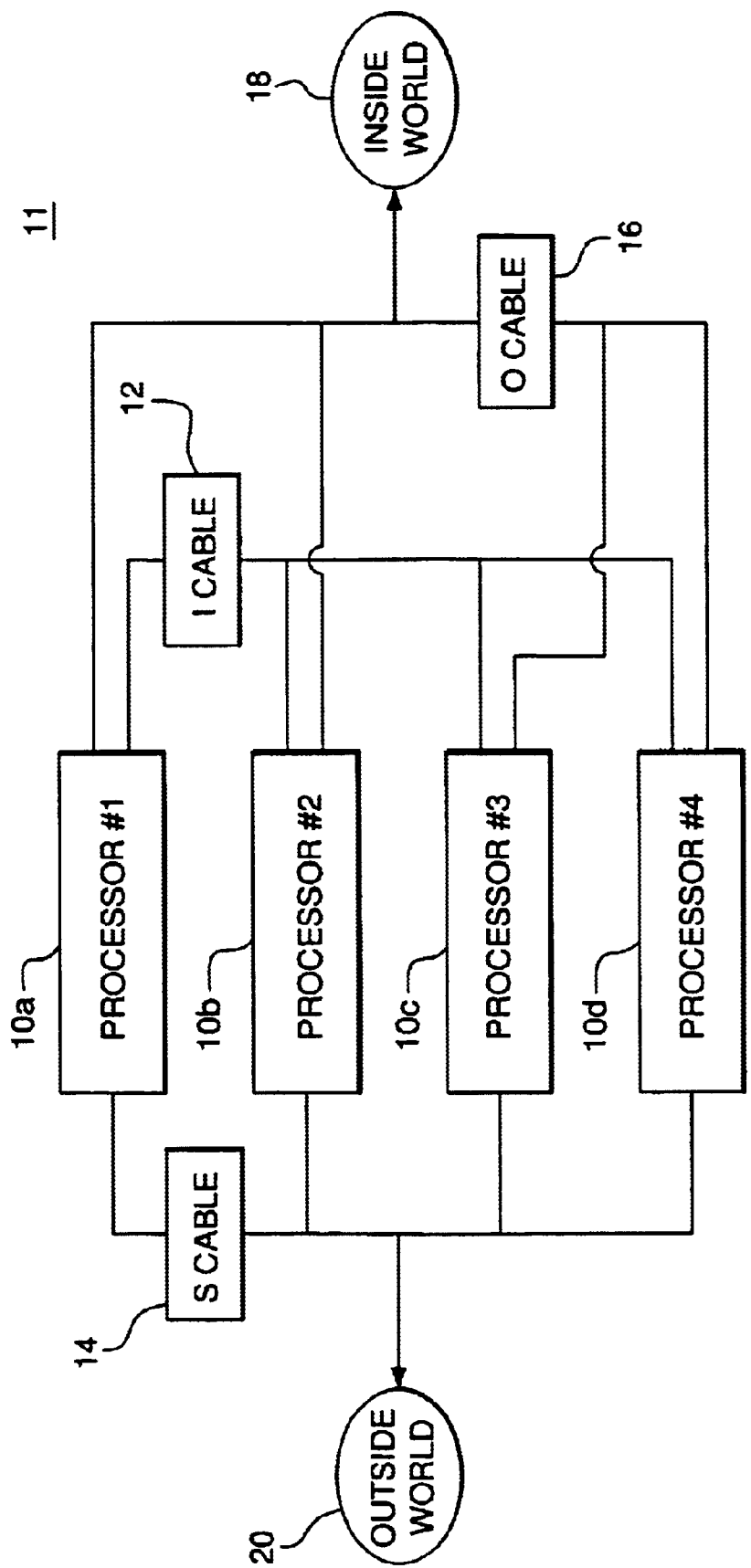
FIG. 1 is a block diagram of the packet processing system of the present invention.

The present invention is described with reference to the enclosed Figures herein, the same numbers are used where applicable. Referring to FIG. 1, an illustration of a representative configuration for the overall processing structure of the present invention is shown. The system comprises hardware, hardware/software or be logical. As shown, the "system" 11 controls data transmission between an outside environment and inside environment As shown, the system, in one embodiment, comprises four processors 10a–10d which are used to process data packets passing from outside of the protected environment to the inside and vice versa. The four processors 10a–10d may be connected by up to eight cables labeled I, $S_1$, $S_2$, $S_3$, $O_1$, $O_2$, $O_3$, and $O_4$. The cable can be physical or logical.

The I (or Interconnect) cable 12 transfers data only between the four processors 10a–10d. The S (or Source) cables 14 transfer data only between the four processors and the external environment. Each S cable 14 connects the system to a separate outside network 20. As an example, one such outside network might be the Internet. Another such network might be a private bank network. The O (or Output) cables 16 transfer information only between the four Processors and the "inside" world or environment. Each O cable 16 connects a separate inside network 18. An example of such an inside network might be a company's intranet for financial information. Alternatively, inside network 18 may comprise a company's intranet for manufacturing information.

Each of cables 12, 14, 16 are isolated from every other by hardware and/or software barriers. As shown, the "system" 11 may comprise up to eight cables, one of which must be an I cable. The other seven may comprise any combination of S and O cables. It is to be appreciated that the system could be modified to provide for more cables. The system design could further be altered to provide for additional processors. A system could alternatively also comprise a single processor, thereby eliminating the necessity of the I cable. It is to be noted that processors 10a–10d may be situated on a single chip, on the same board, in a single box, room, or, alternatively, located separately anywhere in the world.

As is known by those skilled in the art, messages sent over networks such as the Internet are transmitted as one or more discrete 512 kilobyte data packets, which may not follow the same route from source to destination. TCPIP data packets (having an IPv4 format) have the generalized structure illustrated below:

| Header: | Message: |
|---|---|
| Source Address, Destination Address, Packet Number, Port Number | Message Fragment |

The Header includes the source address, destination address, the packet number and the port number for the message. The Header is followed by a portion or fragment of the message itself.

Figure 2A:
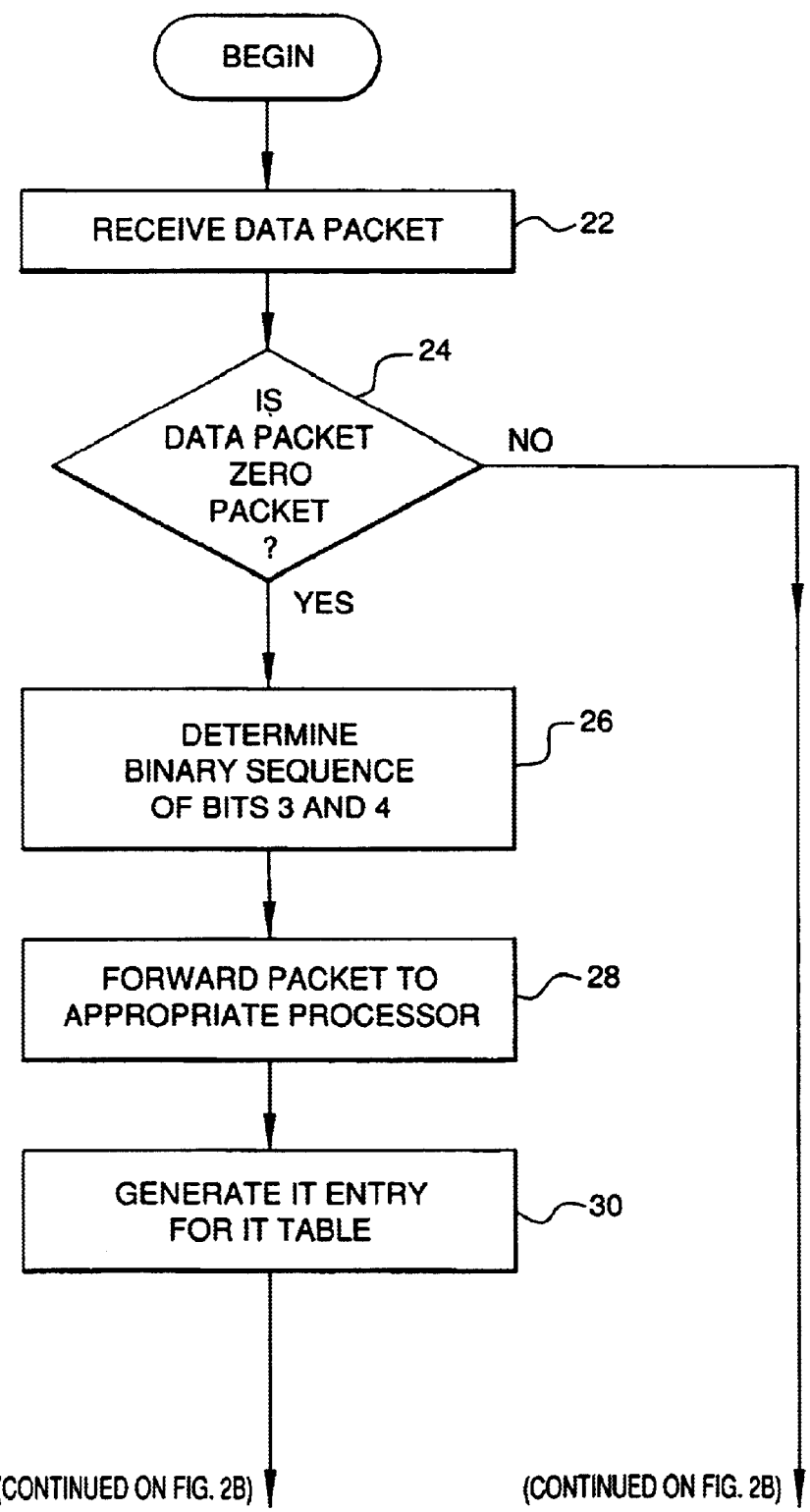
FIGS. 2A and 2B are a flow charts which illustrates the operation of the method of the present invention.
Figure 2B:
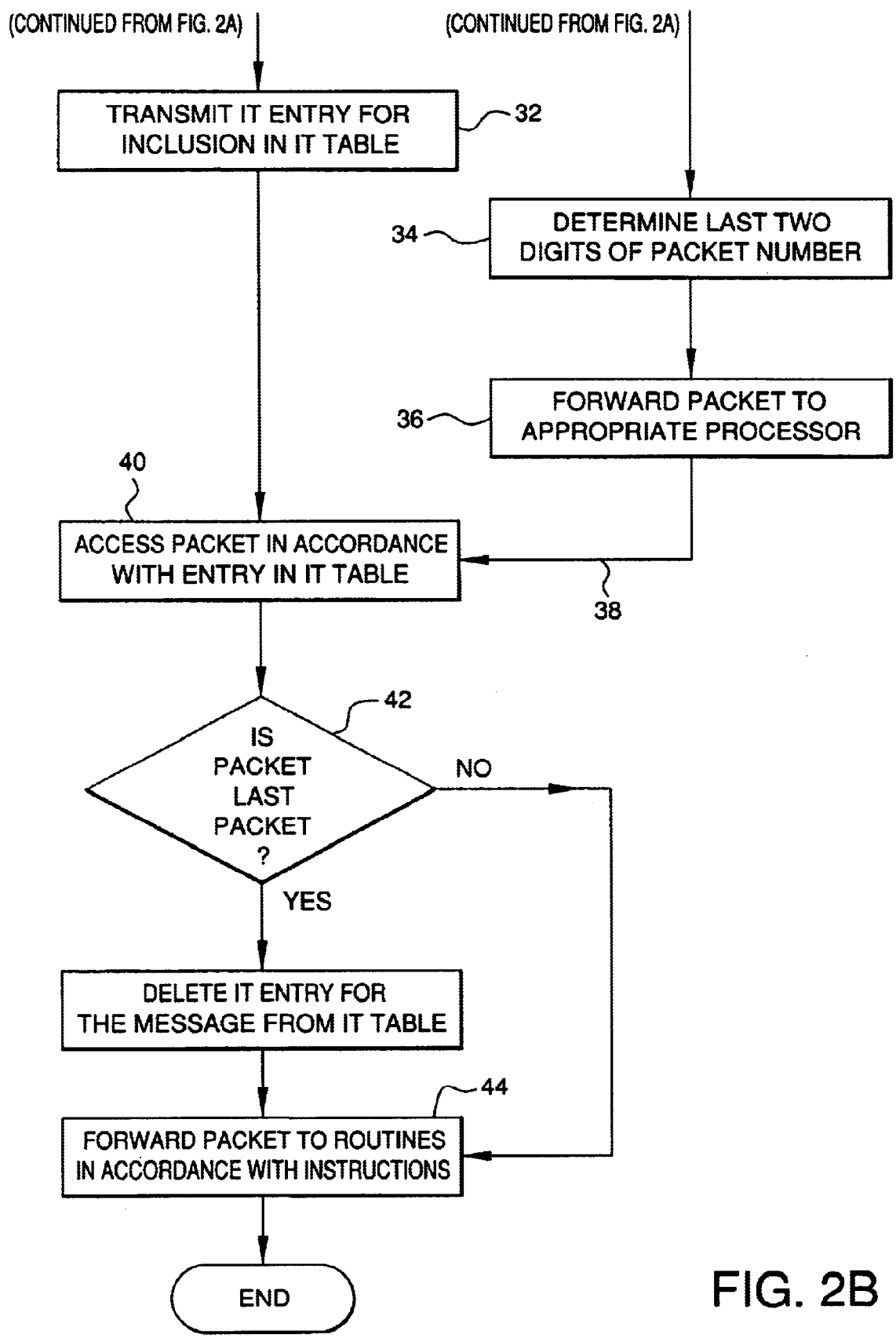

Referring now to FIGS. 2A–2B, a preferred method for using the system of FIG. 1 is shown. For purposes of illustration, it is assumed that a data packet has come from the external environment on cable $S_1$ and is received 22. Initially, the system determines if the Data Packet is a "Zero Packet 24." The first or "Zero Packet" of an electronically transmitted message receives more processing than subsequent packets of the same message. If the packet is a zero packet, the binary sequence of a bit set, in this example, bits 3 and 4 of the source might address 26 are then determined. There are only four mathematical possibilities for these two bits. These are:

```
00
01
10
11
```

Next, the packet is then forwarded for processing to the specific processor 10a–10d whose number corresponds with the sequence of bits 3 and 4 of the source address 28. Because of the scheme for creating addresses, these two bits will typically change from message to message. The effect of using bits 3 and 4 for routing to the processors 10a–10d determines the workload among the four processors 10a–10d so that each receives about the same number of Zero Packets, which require more processing than subsequent packets. The larger the number of packets in a message, the greater the probability for even distribution. It is to be noted that when more than four processors are used, different bit combinations would be used with the effect of having the same number of bit combinations as there are processors.

Next, as shown in FIG. 3, using an existing "Security Table", so-called "IT Entries" are generated for inclusion in the IT Table 30. The IT Table in turn directs all processing of the data Packets. The IT Entry will be sent to all four processors 10a–10d, which will use the entry to process the contents of the Zero Packet and of all subsequent packets of the same message. It is noted that each entry on the IT Table has four component parts:

(a) Source computer address;
(b) Destination computer address;
(c) Port number (which determines which protocol is used to process the contents of the message, e.g., "www.", "http.\\", "ftp", etc. Messages are sent to different ports depending upon whether they contain data, music, video, etc.); and
(d) 128 bit for routing packets for desired procession.

The 128 bit part is the key to efficient processing, enabling routing to be done with a single line of code of the form:

I=1, 128 If [check bit] function(I)] Drop

Each of the 128 bits correspond to a processing function that could be selected for use with a given message. If a bit is turned "on" (i.e., equals 1), the corresponding function is performed. If a bit is turned "off"(i.e., equals 0), the corresponding function is not performed. Use of the bit equals 1 instruction to direct processing is analogous to a "main routine" calling up a "subroutine." For example, if bit No. 12 equals 1, processing control is passed to routine number twelve, which may in one example, scan data packets for viruses. If bit number thirty-two equals 1, processing control is passed to routine number thirty-two, which may, in another example, reroute packets to a destination other than the one intended by the message initiator.

The "IT Entry", including the 128 bit part, is created using a "Security Table", which is created prior to receipt of the data packet. The Security Table comprises a list of instructions indicating the type of processing required for each combination of source address, destination addresses and port numbers contained in the Header of each packet. The Security Table can be as short as a single instruction that causes, for example, all incoming packets to be directed to a port for handling Internet traffic to be scanned for computer viruses. This is accomplished by creating an IT entry for this message with bit number twelve (the virus scan bit) equal to 1. Alternatively, the Security Table can be lengthy, directing many different processing functions for each incoming or outgoing message, depending upon source or destination address, and port number. Messages from a specific outside source can be blocked from entering the internal network at all Messages from an internal source with the word "secret" could be rerouted to an internal security officer rather than sent to the intended destination address. All the processing instructions are reduced by the Security Table to a set of 128 bit settings for each specific message. The 128 bit limit can be increased to 256 or greater.

The possibility for detailed evaluation of each message is an important reason why processing of the "Zero Packet" is more difficult than subsequent packets of the same message. Reference to the Security Table is necessary only once per message. The end result of this step is the creation of single IT entry with each of the 128 bits turned on or off in accordance with desired processing instructions for each packet of the corresponding message.

In the next step 32, the IT entry is transmitted to all four processors 10a–10d for inclusion in the IT Table. This transmission is made using the I cable 12. This transmission updates the IT Table on all processors 10a–10d in order to keep them identical. Consequently, subsequent packets of the same message will be processed identically, regardless of which of the Processors is used.

Referring to FIG. 2B, when processing packets other than the zero packet 34, the last several bits of the packet number are initially determined. Every packet has a number corresponding to the sequence of the packet in the total message. Next, the packet is forwarded for processing to a processor whose number corresponds with the sequence of digits of the packet number 36. All packets in a message other than the Zero Packet are routed in accordance with their packet numbers, assuring an even distribution of packets among the four Processors 36.

Next, the packet is processed in accordance with the entry in the IT Table that corresponds to the packets source address, destination address and port number 40. Next, it is determined whether the packet is the last packet of the message 42. The packet Headers indicate how many packets are in each message. The Processors count the number of packets processed, communicating among themselves over the I cable and delete the IT Entry for the message from the IT Table. When all the packets have been processed, this fact is communicated to the other processors using the I cable 12.

Finally, the packet is forwarded to routines in accordance with instructions obtained during processing 44. As a result, the packet might be forwarded to the address intended by the source computer user, rerouted to an alternate address, or not forwarded at all. Another packet is then ready to be processed.

In the event that a packet of a message is missing, the processor 10*a*–10*d* responsible for processing that packet (according to the packet number) is interrogated ("pinged") using the I cable to determine if the Processor is functioning properly. Consequently, failure testing is initiated only when it is probable that there was a failure. This approach is more efficient than constant interrogation.

If one of the processors is, in fact, determined to be in failure, all traffic is automatically and immediately sent to another processor. This feature provides built-in hardware backup, since all the processors are capable of the same functionality. If the processors are at physically remote locations, the hard-wire cables are replaced by telephone. The present system permits exchanging information between locations using only a single firewall, thereby eliminating the time and cost which would be required for multiple firewall processing.

Figure 4A:
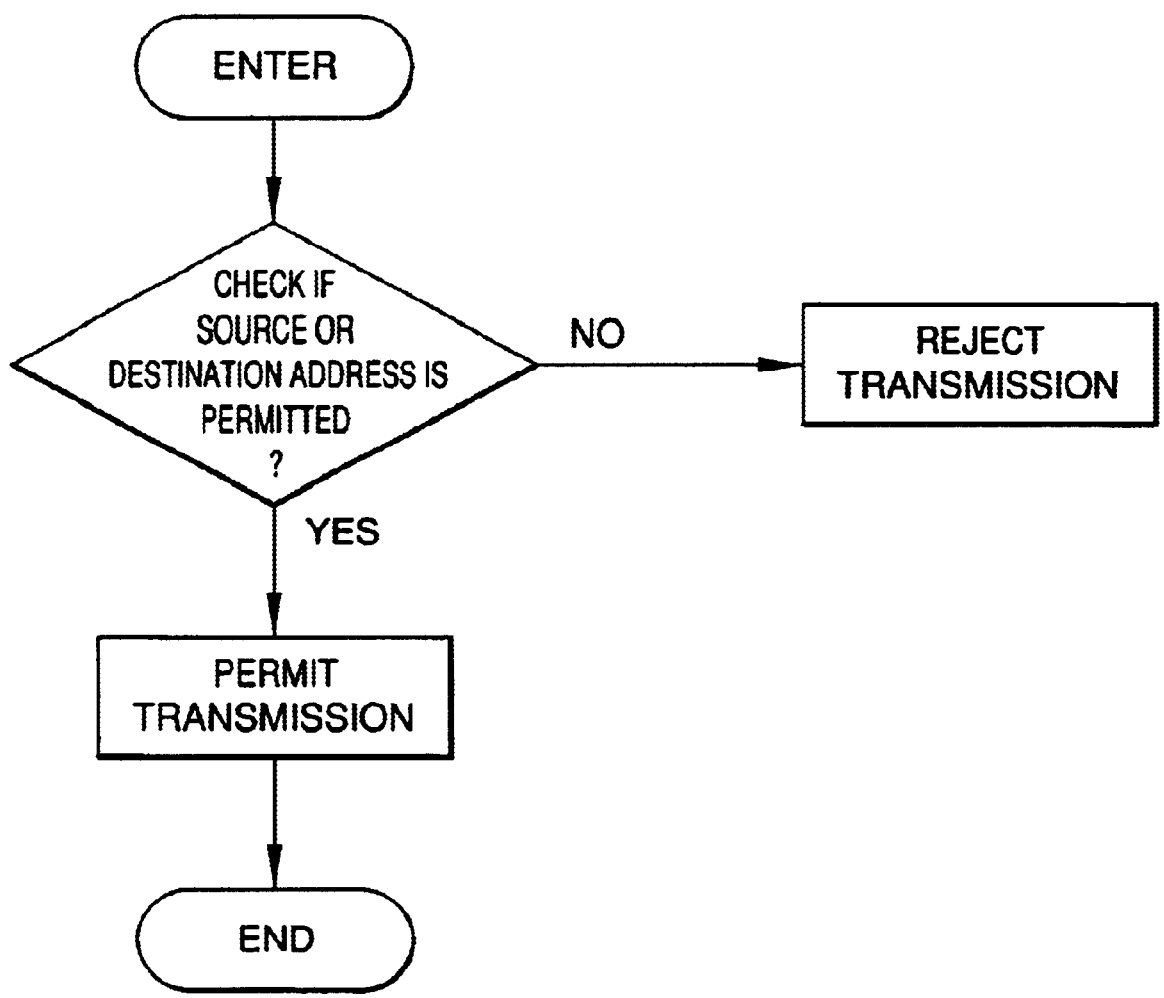
FIGS. 4A–4C are flow chart diagrams which illustrate other control routines for use in the present invention.
Figure 4B:
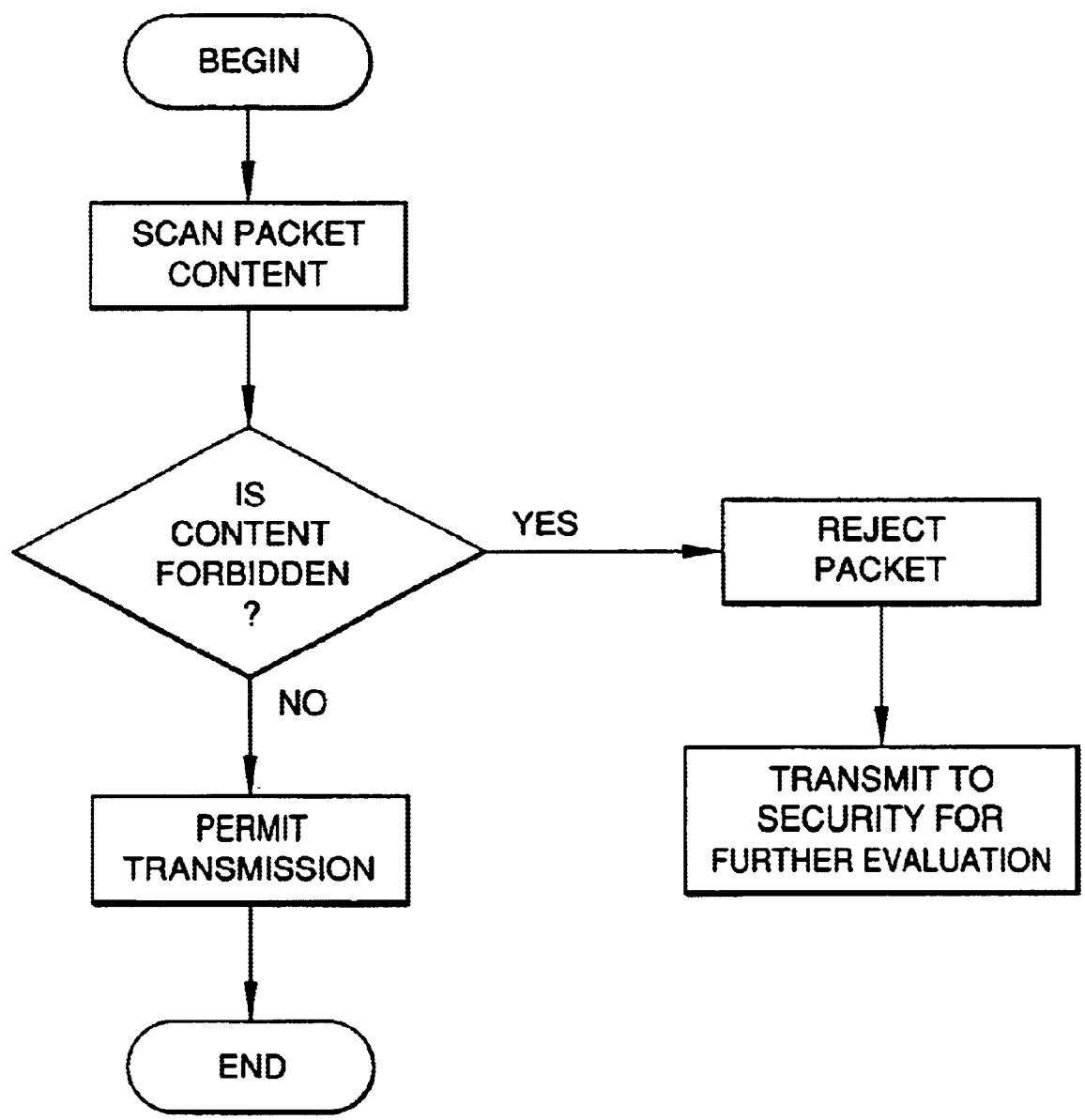
Figure 4C:
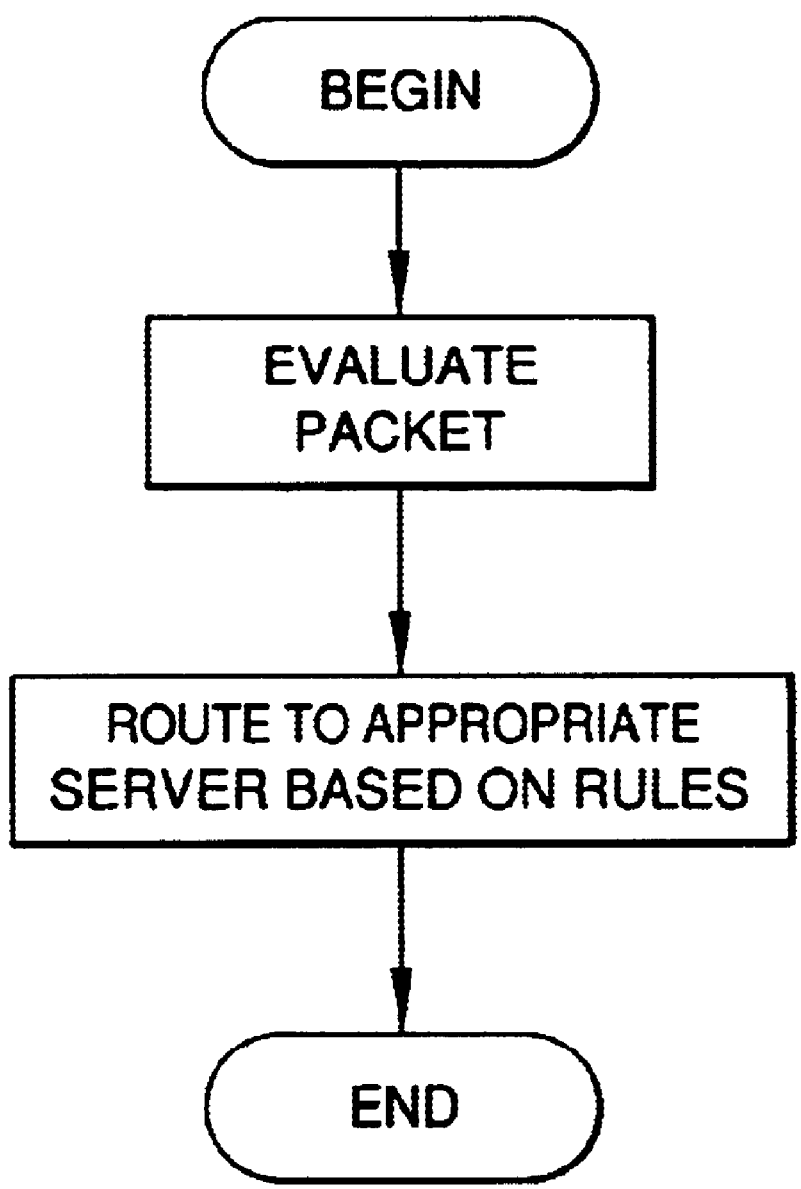

As shown in FIGS. 4A–4C, the present invention includes a number of routines which assist in packet routing and security. Some of the 128 bits in an IT Entry will direct processing to routines that provide "export control" by examining packets to determine whether they will be allowed to be sent from one network to another.

As shown in FIG. 4A, a first routine checks the source and/or destination address to see if the combination is forbidden. If so, the packet is not sent. This feature, for example, can prevent any messages from being sent from a communal workstation. Referring to FIG. 4B, another routine looks at the packet content, scanning for specific words or character sequences (with or without reference to the source and destination addresses) determines whether a forbidden sequence is included in the packet. If so, the packet is not sent. This feature could, for example, identify and prevent export of all messages containing a Microsoft "Excel" spreadsheet, an Adobe file, or any message dealing by name with the subject, "Strategic Planning." In addition to not sending a packet or message to the intended address, the processor may be directed to send the packet or message to an internal security address for evaluation.

A further routine shown in FIG. 4C evaluates and reroutes packets to an appropriate server in accordance with established rules for optimal processing. This routine will determine the optimal server by referring to a table containing decision rules regarding available ports, legal jurisdiction, physical locations, and optical number of locations and routing. Some or all of these servers may be "synchronized," i.e., use identical IT Tables.

When a port request is received, the latest status alliance update is consulted and the server with support for that port that has the lowest "load factor" receives the transmission. If a security transaction is involved in the transmission, the present invention will issue to the two correspondents (one at the source, one at the destination) a "session key" via an encrypted status alliance update. Because the processing is not seen by either correspondent, it appears as if a transaction has appeared "out of the blue". This forces any party trying to find the session key to track every packet to each correspondent to determine if that packet contained the session key. In the prior art, by contrast, correspondents exchange encrypted keys, making it comparatively easy for third parties to find the key, tracking transmissions between source and destination IPs.

Additional routines are suggested by the present invention. If there are legal constraints on the physical location of a correspondent, as in the case of transmitting a "bet" which must be made outside the state of residence of the bettor, the present invention can route the transaction to a server outside the state, thereby making the transaction legally permissible. Rerouting to the optimal server on the basis of the least number of hops is accomplished by returning a packet to the initiator with the source address of a server near (in terms of hops) to the initiator. The present invention accomplishes this transparently, eliminating delay and latency.

A still further aspect of the present invention is the provision of a routine to convert from the IPv6 format to the IPv4 format. One of the 128 bits in an IT entry directs processing to routines that convert incoming addresses in the IPv6 format to IPv4 format which can be read by existing equipment. This permits economical deferral of investment necessary for upgrading to the IPv6 format.

A still further routine provides for selective jamming. One of the 128 bits in an IT entry directs processing to a routine that permits permissible transmissions and jams those which are not. Jamming involves modifications (electrical and logical) to an existing Network Interface Card (NIC). These cards read the information contained in packet headers. As a result of the modifications, the NIC will detect a combination of source and destination addresses that is not listed on the Security Table as permissible ("legal") for the subnet. Packets with permissible address combinations are transmitted. However, if an address combination is detected that is not permitted, the NIC will begin transmitting random "1's" and "0's" to jam the transmission. Within CSMA/CD (ethernet), collisions resulting from this jamming will cause the packet to be retransmitted after a random elapse of time, but this retransmission will also be jammed. Attempts to send packets to non-permissible addresses can be logged, traced, tracked and investigated as part of routine security enforcement. This innovation prevents hackers from bypassing the firewall by preventing communication to and from their address, which would not be listed as a permissible source or destination.

This may be accomplished by synchronizing two or more servers by imaging the disk. The present invention creates a dual map for an IP address. Incoming requests are rerouted to the Mirrored Server Addresses if a specified number of which servers respond to the incoming query. If one server (of a possible n servers) does not respond in a timely fashion, the present invention declares it unavailable and initiates repair/response while continuing to serve incoming request with remaining servers maintained in synchronization.

It is to be noted that the system appears to be a server to the outside world, but in fact, it is rerouting to actual servers, from two to infinite in number, which operate in parallel over the Internet or network. When the system receives enough confirming responses from these actual servers, it responds to the "outside" world. For example, assuming a company has servers in Jessup, Md., Miami, Fla., and Los Gatos, Calif. An earthquake hits Los Gatos, but the Jessup and Miami servers continue to give uninterrupted service. The Los Gatos server could be resynchronized as soon as the after shocks permit. When a hurricane hits Miami, the Los Gatos and Jessup servers enable continuous operation. If any of the servers get hacked, operators may then take that machine off-line.

The present invention has been described with reference to the enclosed Figures and detailed description. The true nature and scope of the present invention is to be determined with reference to the attached Claims.

I claim:

1. A method for transmitting secured data packets over a network comprising the following steps:
   (a) receiving a data packet having a source address from a point external to the network;
   (b) determining whether the data packet is a zero packet, and if so:
      (i) determining the binary sequence of a predesignated bit set in the source address of the packet;
      (ii) forwarding the packet to a processor whose number corresponds with the sequence of the bit set;
      (iii) using a security table to generate an IT entry in an IT table for directing the processing of data packets;
      (iv) transmitting the IT entry to a plurality of processors for inclusion in said IT table;
      (v) processing the packet in accordance with the entry in the IT table that corresponds to the source address, destination address and point number of the packet;
   (c) determining whether the packet is the last packet of the message, and if so:
      (i) deleting the IT entry for the message from the IT table; and
      (ii) forwarding the packet for further processing.

2. The method of claim 1, comprising the following additional steps to be utilized when the packet is not a zero packet:
   determining the last several bits of the packet number;
   forwarding the packet for processing to the processor whose number corresponds with the bit set of the packet number;
   completing steps (b)(iv) and (b)(v).

3. The method of claim 1, further comprising the step of checking the source or destination address of a packet and determining whether the source or destination is permissible.

4. The method of claim 1, further comprising the step of examining the contents of a packet and determining whether the packet may be transmitted.

5. The method of claim 1, further comprising the step of determining the processor which should process the data based upon a plurality of criteria.

6. The method of claim 1, comprising the additional step of converting in-coming data from an IPv6 format to an IPv4 format.

7. The method of claim 1, comprising the additional step of jamming impermissible transmissions.

8. The method of claim 7, wherein said jamming is accomplished utilizing a network interface card.

9. A method for transmitting secured data packets over a network comprising the following steps:
   (a) receiving a data packet from a point external to the network;
   (b) determining whether the data packet is a zero packet, and if so:
      (i) determining the binary sequence of the third and fourth bits of the source address of the packet;
      (ii) forwarding the packet to a processor whose number corresponds with the sequence of the third and fourth bits;
      (iii) using a security table to generate an IT entry in an IT table for directing the processing of data packets;
      (iv) transmitting the IT entry to a plurality of processors for inclusion in said IT table;
      (v) processing the packet in accordance with the entry in the IT table that corresponds to the source address, destination address and point number of the packet.
   (c) determining whether the packet is the last packet of the message, and if so:
      (i) deleting the IT entry for the message from the IT table; and
      (ii) forwarding the packet for further processing.

10. A system for processing data packets between a first external environment to the system and a second external environment to the system comprising:
   a plurality of processors external to an internal environment, each processor processing data packets based upon an initial criteria of the packet;
   first logical cable means for connecting the plurality of processors and for transmitting data packets between said plurality of processors based upon said initial criteria;
   second logical cable means for transmitting the data packets between the plurality of processors and the first and second external environments; and
   third logical cable means for transmitting data between the plurality of processors and the first and second external environments,
   wherein a second set of plurality of processors communicates over a logical status and load information cable.

11. The system of claim 10 wherein the second plurality of processors further communicates over a logical hops information cable (wherein hops information is a measure of logical nearness).

12. The system of claim 10 wherein the second plurality of processors accepts and the original plurality of processors grants a logical connection to a requesting IP address.

13. The system of claim 12 wherein the second plurality of processors acquires the logical connection to the requesting IP address based upon criteria such as load, out of service indications, or information related to logical nearness.

14. The system of claim 12 wherein the second plurality of processors acquires the logical connection to the requesting IP address based upon criteria such as load, out of service indications, or logical nearness.

* * * * *